(12) United States Patent
Shelor

(10) Patent No.: US 7,254,670 B2
(45) Date of Patent: Aug. 7, 2007

(54) SYSTEM, METHOD, AND APPARATUS FOR REALIZING QUICKER ACCESS OF AN ELEMENT IN A DATA STRUCTURE

(75) Inventor: Charles Shelor, Arlington, TX (US)

(73) Assignee: VIA Technologies, Inc., Taipei (TW)

( * ) Notice: Subject to any disclaimer, the term of this patent is extended or adjusted under 35 U.S.C. 154(b) by 411 days.

(21) Appl. No.: 10/983,548

(22) Filed: Nov. 8, 2004

(65) Prior Publication Data

US 2006/0101228 A1    May 11, 2006

(51) Int. Cl.
*G06F 12/10*    (2006.01)
*G06F 15/76*    (2006.01)

(52) U.S. Cl. .................. 711/109; 711/219; 711/220; 711/147; 709/212; 709/213

(58) Field of Classification Search ............ None
See application file for complete search history.

(56) References Cited

U.S. PATENT DOCUMENTS 6,560,691 B2 *  5/2003  Chen .................... 711/219
6,567,898 B1 *  5/2003  Tsuruta ................. 711/154

* cited by examiner

*Primary Examiner*—Kevin L. Ellis
*Assistant Examiner*—Mardochee Chery
(74) *Attorney, Agent, or Firm*—Thomas, Kayden, Horstemeyer & Risley

(57) ABSTRACT

This disclosure generally relates to a processor configured to access an element in a data structure. The processor includes an element in a data structure having an array, an index, and a base address. A fractional shifter is also included and is configured to shift the index value up to three bit places, and output a byte offset. An adder is configured to add the byte offset with the base address and output a final address. Further included is a general purpose shifter that is configured to rotate left and right, and shift left and right. A selector is configured to select either the final address or an output signal from the general purpose shifter.

17 Claims, 14 Drawing Sheets

SYSTEM, METHOD, AND APPARATUS FOR REALIZING QUICKER ACCESS OF AN ELEMENT IN A DATA STRUCTURE

TECHNICAL FIELD

This disclosure relates to reducing delay time within a processor, and, more specifically, to a logic configuration that allows the address of an array element to be calculated in a single clock cycle.

BACKGROUND

One of the more common operations in computer software is the access of an element of a data structure. This access is usually given as the base address of the data structure with an index to the element within the structure. This is especially common in the accessing of elements within an array. The computer software program generally indicates the $i^{th}$ element of an array using nomenclature such as "x=array[i]." When the array is a half word, word; or double word, the index is oftentimes converted to a byte offset by shifting the index value left by 1, 2, or 3 bit positions to get the offset, which is then added to the base address. This generates the final address, which is used to access data in memory.

The common approach to implement the conversion from index to offset is to utilize a general purpose shifter with an adder in the execute stage of the pipeline. A general purpose shifter has the capability to shift left, shift logical right, shift arithmetic right, and rotate right, all by 0 to 32 bit positions. The general purpose shifter shifts the index the appropriate amount, which consumes the first clock cycle. An adder then adds this value with the base address, consuming the second clock cycle.

The disadvantage of this configuration is the consumption of two clock cycles to perform this frequent operation. Because the processor performs this operation numerous times during operation, processor time is lost due in part to this time consuming operation.

Accordingly, there is a heretofore unaddressed need to overcome the definitions and shortcomings described above.

SUMMARY

Certain objects, advantages and novel features of the disclosure will be set forth in part in the description that follows and in part will become apparent to those skilled in the art upon examination of the following or may be learned in practice.

The present disclosure is generally directed to a processor having improved logic. In accordance with one embodiment, the processor includes a system for realizing quicker access of an element in a data structure having an array, at least one index, and a base address. A fractional shifter is also included and is configured to shift the index value, and output a byte offset. Also included is an adder configured to add the byte offset with the base address and output a final address. A general purpose shifter and a selector are included as well. The selector is configured to select either the final address or an output signal from the general purpose shifter.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
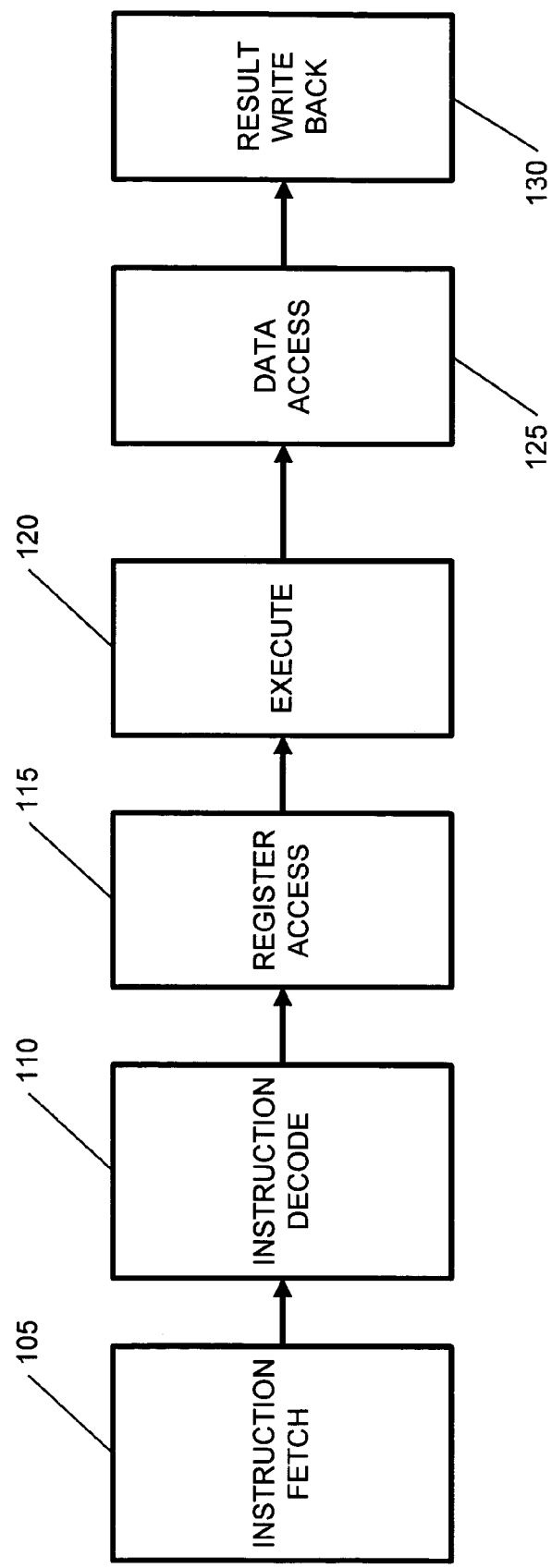
FIG. 1 illustrates a functional block diagram of a pipeline configuration within a microprocessor.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. It should be emphasized that many variations and modifications may be made to the above-described embodiments. All such modifications and variations are intended to be included herein within the scope of this disclosure and protected by the following claims.

A pipeline configuration comprises a sequence of actions that a central processing unit (CPU) performs to execute each machine code instruction in a program. At the beginning of each cycle the CPU presents the value of the program counter on the address bus (not shown). The CPU then fetches the instruction from main memory (possibly via a cache and/or a pipeline) via the data bus into the instruction register.

FIG. 1 is a functional block diagram of a non-limiting exemplary pipeline configuration in a CPU. In this representation, the CPU performs 6 stages. In the first stage 105, the CPU fetches an instruction from another part of the computer.

After the instruction fetch stage 105 is implemented, the processor then decodes the instruction in stage 110 to determine how to execute it. Decoding the present instruction may reveal whether the instruction calls for an Arithmetic Logic Unit (ALU) function (such as add, subtract, etc.); whether it will perform an addressing function; or other type of function. Decode stage 110 also determines which registers are needed to execute the instruction and accesses the registers from the register file (not shown). Once the registers are recognized, instruction decode stage 110 will also fetch the data from the appropriate register (or RAM, cache, etc.) for use by the execute stage 120.

Once the instruction is decoded and the registers are accessed, execute stage 120 executes the present instruction. This means that execute stage 120 calculates the results of the instruction. These results include the addresses of loads and stores, as well as values computed by the ALU. As a non-limiting example, if the instruction calls for addition, execute stage 120 will perform addition on the two values stated.

Once the instruction is executed, the processor may then access the data as shown in data access stage 125 and write back data into the appropriate register(s), located in the register file, as shown in stage 130. With an addition function, the ALU will generally be given two operands located in two different registers. The ALU will perform the add function. Write back stage 130 will then put the result into a register designated by the instruction. The CPU increments the program counter to address the next instruction and the cycle is repeated. This operation stops when the processor is instructed to break the cycle.

Figure 2:
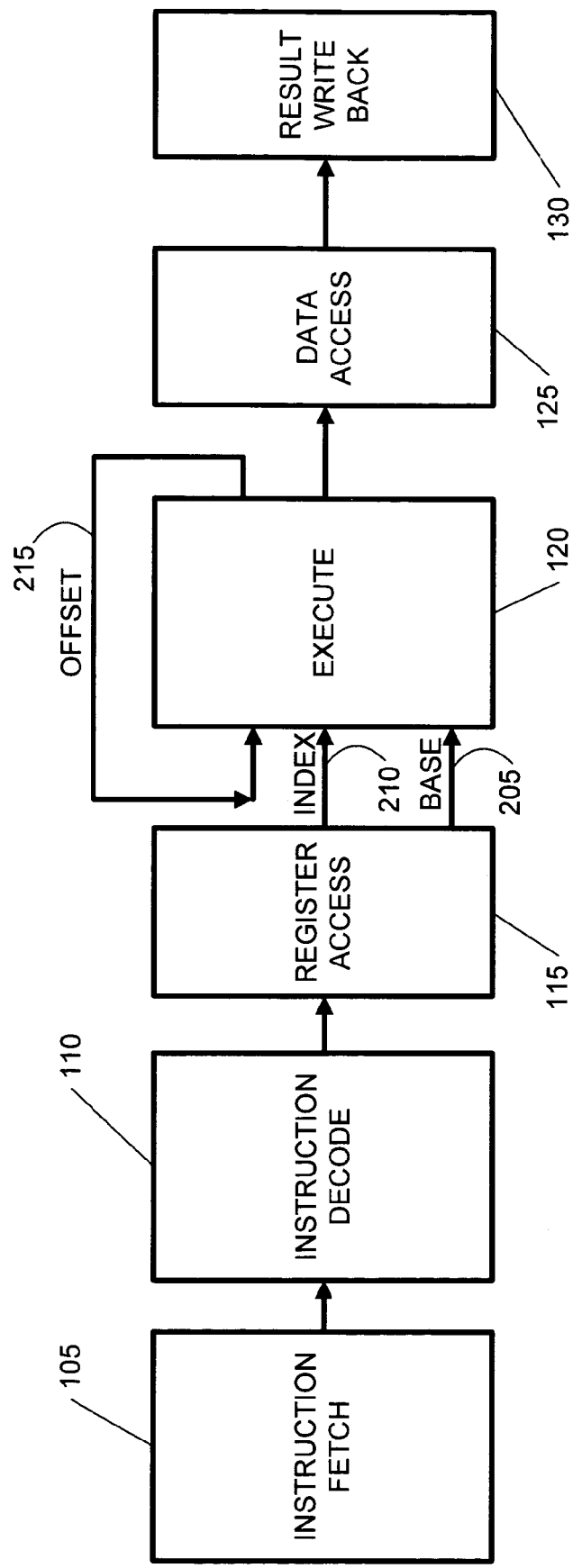
FIG. 2 illustrates a functional block diagram of an alternate embodiment to the microprocessor of FIG. 1, depicting the accessing of an element of a data structure.

FIG. 2 is functional block diagram of an alternate embodiment to the microprocessor of FIG. 1, depicting the accessing of an element of a data structure. When computer software is configured to access an element of a data structure, an approach is to utilize a general purpose shifter in the execute stage of the pipeline. FIG. 2 illustrates how register access stage 115 communicates the index of the array 210 and the base address 205 to execute stage 120. Execute stage 120 calculates the offset 215 and communicates this data back into execute stage 120 to calculate the final address. This approach typically spans two clock cycles.

Figure 3:
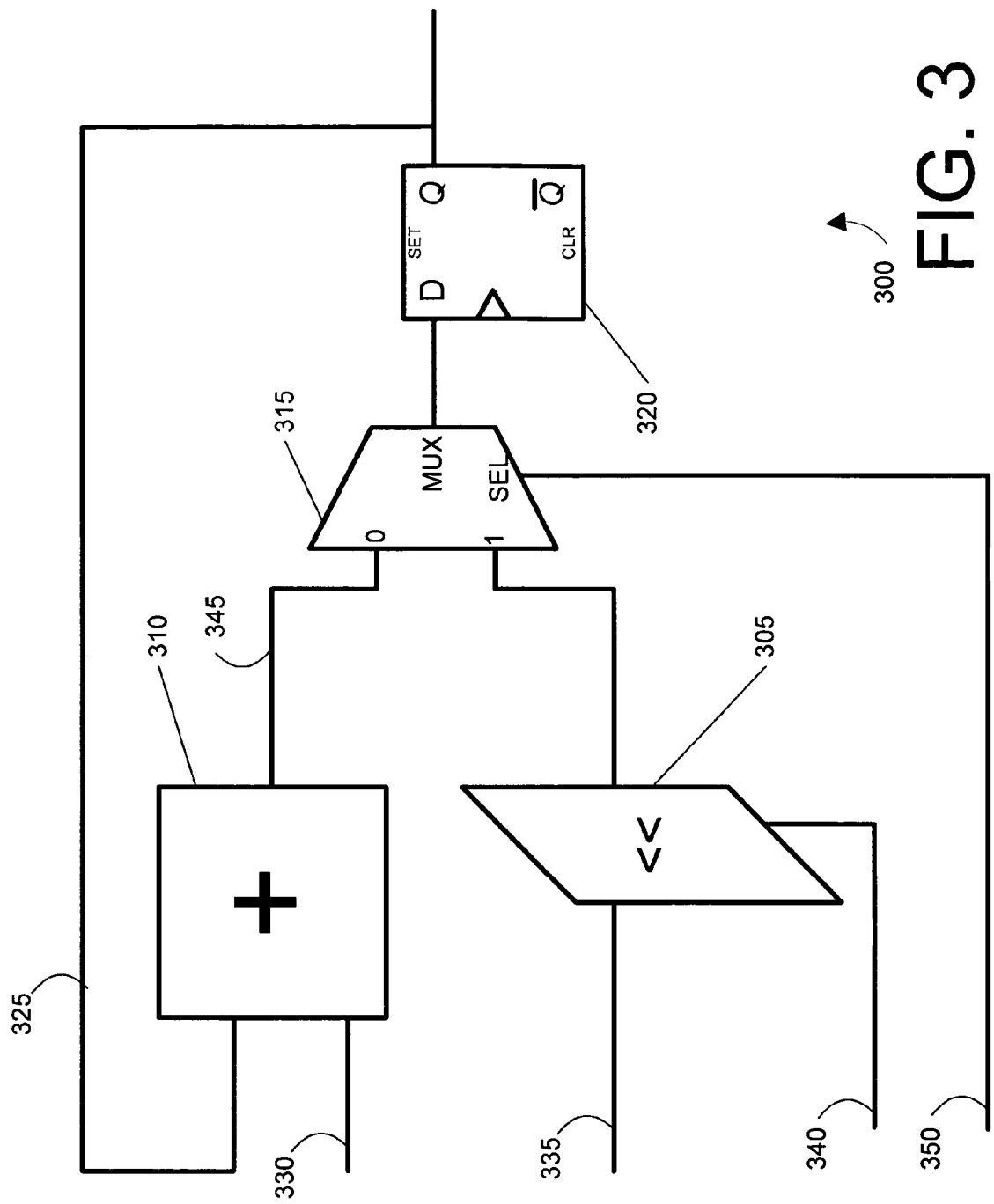
FIG. 3 is a functional block diagram of a circuit implementing a portion of the pipeline configuration of FIG. 2.

FIG. 3 is a diagram of a circuit implementing a portion of the pipeline configuration of FIG. 2. In this circuit 300, adder 310 and general purpose shifter 305 are electrically coupled to multiplexor 315, which is coupled in series with flip-flop module 320. The output of flip-flop module 320 is coupled to adder 310. As is evident to one of ordinary skill in the art, adder 310 may be part of a larger unit, such as an ALU.

In operation, an index 210 (FIG. 2) from an array is communicated to general purpose shifter 305 via shifter input line 335. Shift line 340 is utilized to indicate to the general purpose shifter 305 the amount that index 210 will be shifted. The shifted index (which is now byte offset 215 in FIG. 2) is sent to multiplexor 315, which also receives select signal 350 that allows byte offset 215 to pass to flip-flop module 320. Flip-flop module 320 sends byte offset back to the input of 310, via feedback line 325. Base address 205 is communicated to adder 310 via path 330. Adder 310 adds the base address 205 (FIG. 2) and byte offset 215 (FIG. 2) to achieve the final address. The final address is communicated to multiplexor 315 via final address line 345. Multiplexor 315 allows the final address to pass in this non-limiting example because select signal 350 instructs multiplexor 315 to do so. The final address then passes through flip-flop module 320, and onto the next stage in the pipeline.

As discussed above, despite the simple circuitry illustrated in FIG. 3, the problem with such an implementation is that because the signal is communicated back into adder 310, this process spans 2 clock cycles. The shift function consumes the first clock cycle, and the addition consumes the second.

Figure 4:
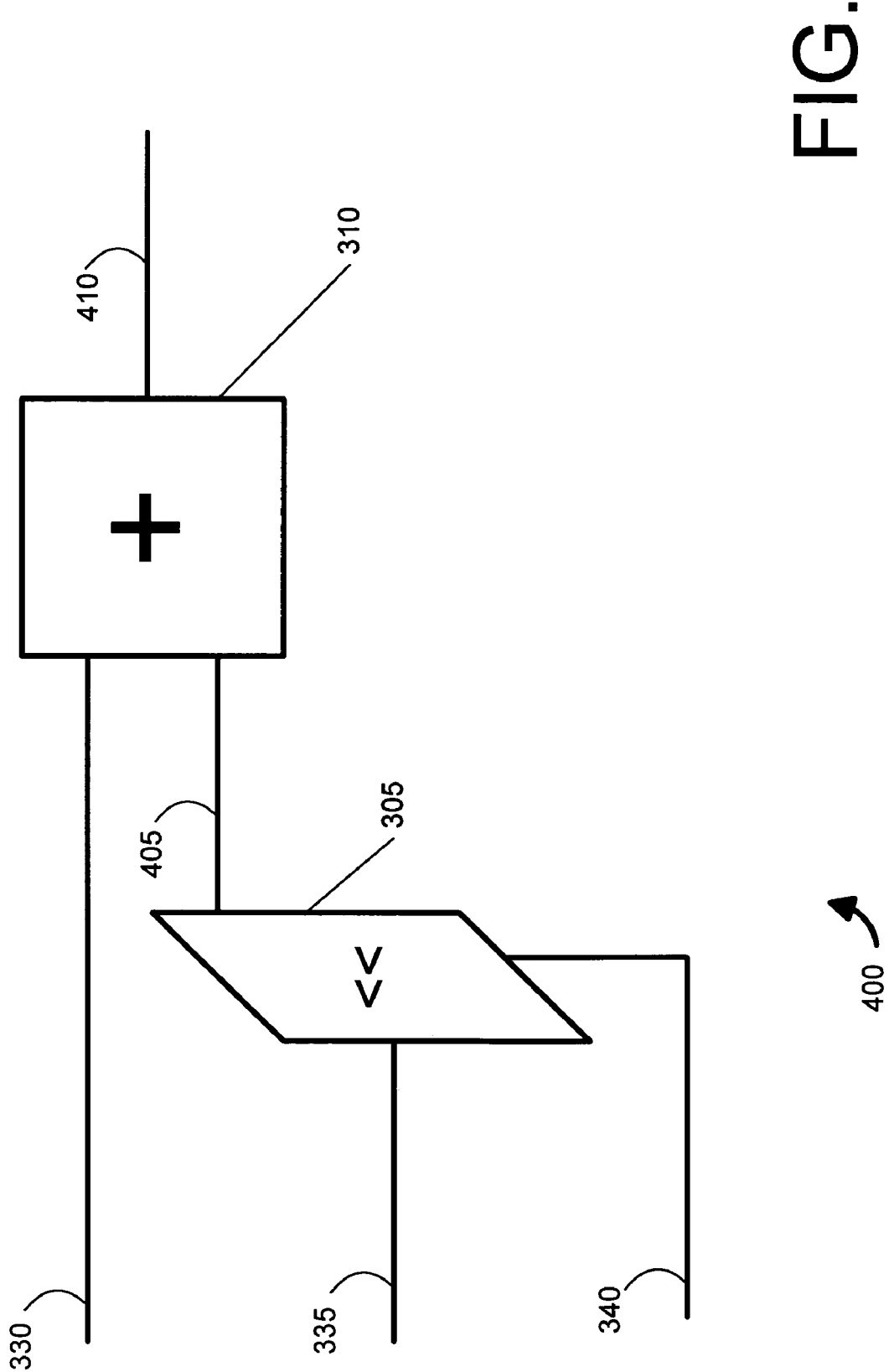
FIG. 4 is a functional block diagram of a circuit of the microprocessor of FIG. 1 configured to operate in a single clock cycle.

FIG. 4 is an alternate embodiment configured to perform the same task as described above. This configuration uses general purpose shifter 305 in series with adder 310. Circuit 400 can perform the operation described above in a single clock cycle as opposed to the two clock cycles for circuit 300 of FIG. 3.

As illustrated in FIG. 4, index 210 is communicated to general purpose shifter 305 via shifter input line 335. As discussed above, shift line 340 indicates the amount to shift index 210. However, in this configuration, the byte offset is communicated directly to the adder 310 via communication path 405. Adder 310 adds byte offset and base address (base address is communicated to adder 310 via base address communication path 330). The final address is communicated to the next stage of the pipeline via path 410.

While this configuration can execute the desired actions in a single clock cycle, gate delay may be an issue. Generally, a 32-bit adder will consume 12 gate delays, and a 32-bit general purpose shifter (which has the ability to shift logical, shift arithmetic, and rotate) will consume 7 to 8 gate delays. With as many as 20 gate delays (using 32-bit words), the clock runs at a slow rate to execute this operation in a single clock cycle.

Figure 5:
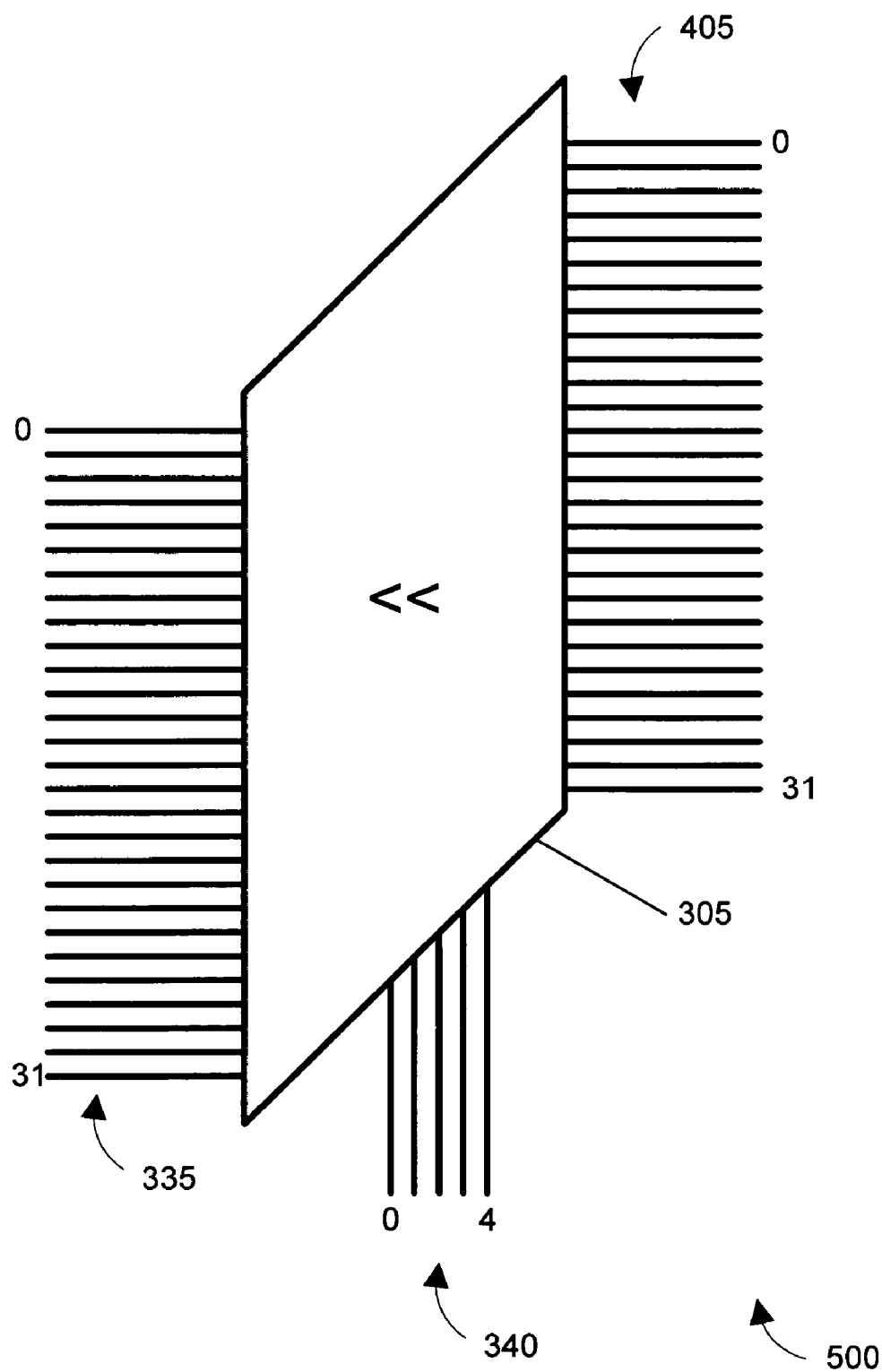
FIG. 5 is a functional block diagram of a general purpose shifter, as shown in FIGS. 3 and 4.

FIG. 5 illustrates a functional block diagram of the general purpose shifter 500 of FIGS. 3 and 4. This type of shifter is generally used in processors today because of its ability to shift logical, shift arithmetic, and rotate. The shifter 500 has 32 bit inputs 335, and 32-bit outputs 405. Shifter select line 340 may be configured as a 5-bit input that allows shifting and rotating of up to 32-bits.

Figure 6:
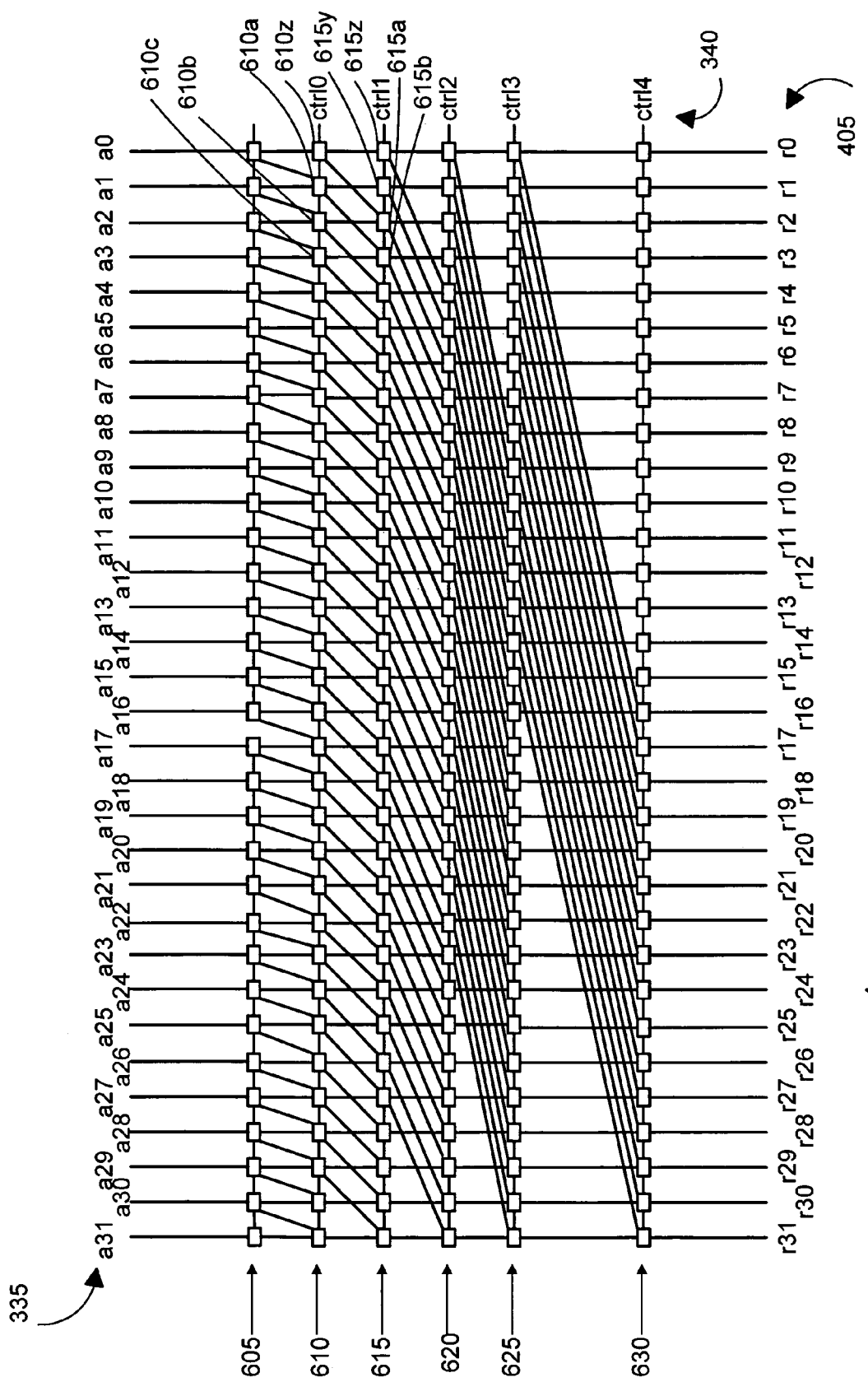
FIG. 6 is a functional block diagram of circuitry within the general purpose shifter of FIG. 5.

FIG. 6 is a functional block diagram of circuitry 600 that may be found in general purpose shifter 305. As illustrated in FIG. 6, circuit 600 has 32 inputs (335), labeled $a_{31}$ to $a_0$; 32 outputs (405) labeled $r_{31}$ to $r_0$; and 5 shifter select inputs (340) labeled $ctrl_4$ to $ctrl_0$.

This configuration initially sends each input into the corresponding stage 0 input buffering blocks 605 (the first row of squares). Then, each input is forwarded, both vertically downward, and diagonally downward to the stage 1 multiplexors 610. Each of the stage 1 multiplexors 610 receives the input directly above it and one bit position lower. As a non-limiting example, multiplexor 610a receives input $a_1$ (directly above it) and input $a_0$ (one bit position lower). The stage 1 multiplexors 610 receive $ctrl_0$ as the select input.

The output of stage 1 multiplexors 610 is then input both vertically downward and diagonally downward across two bit places. This correlates to the stage 2 multiplexors 615 receiving input from the multiplexor directly above it and two bit positions lower. As a non-limiting example, multiplexor 615b receives input from 610c (directly above it) and 610a (two bit positions lower). The stage 2 multiplexors receive $ctrl_1$ as the select input. Stage 3 multiplexors 620 mirror the input/output structure of stage 1 and 2, except that the second input is now four bit positions lower. Stage 4 multiplexors (630) are eight bit positions lower and stage 5 multiplexors (635) are 16 bit positions lower.

As is evident to one of ordinary skill in the art, due to the nature of this configuration, some stages will comprise multiplexors with one input and a select input (e.g., 610$z$, 615$z$, and 615$y$). In these situations the multiplexor may be removed.

Figure 7:
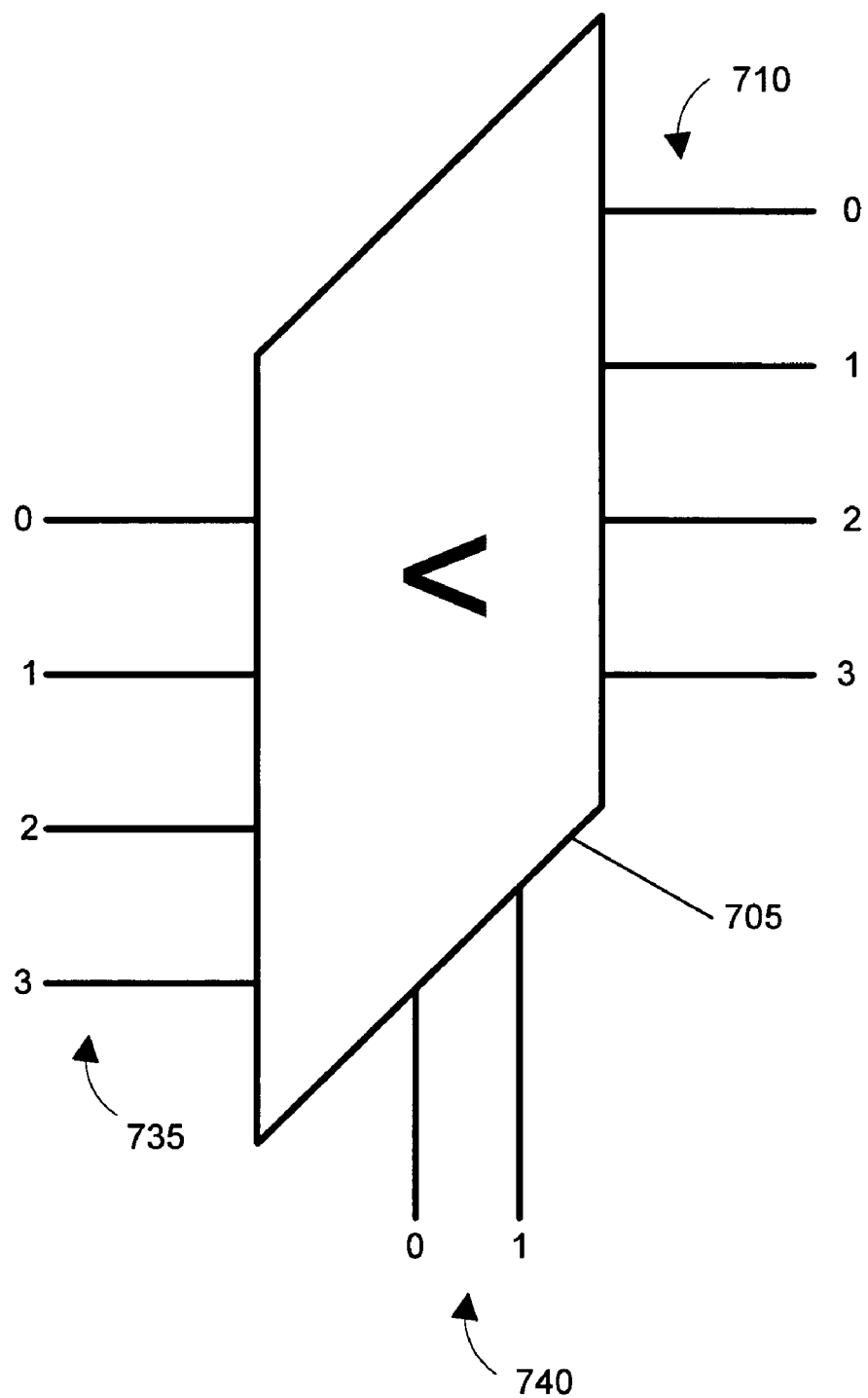
FIG. 7 is a functional block diagram of a fractional shifter which may be used with the microprocessor of FIG. 1.

Generally, when accessing a data structure, index 210 (FIG. 2) is logically left-shifted 1 to 3 bit places, which means that the general purpose shifter 305 is not optimally suited for many operations within the processor. FIG. 7 illustrates a fractional shifter 705 with 4 inputs 735 and 4 outputs 710. The 2-bit shifter select line 740 allows the shifter to shift the 4-bit index 1, 2, or 3 bit places, as usually used when accessing a data structure.

Figure 8:
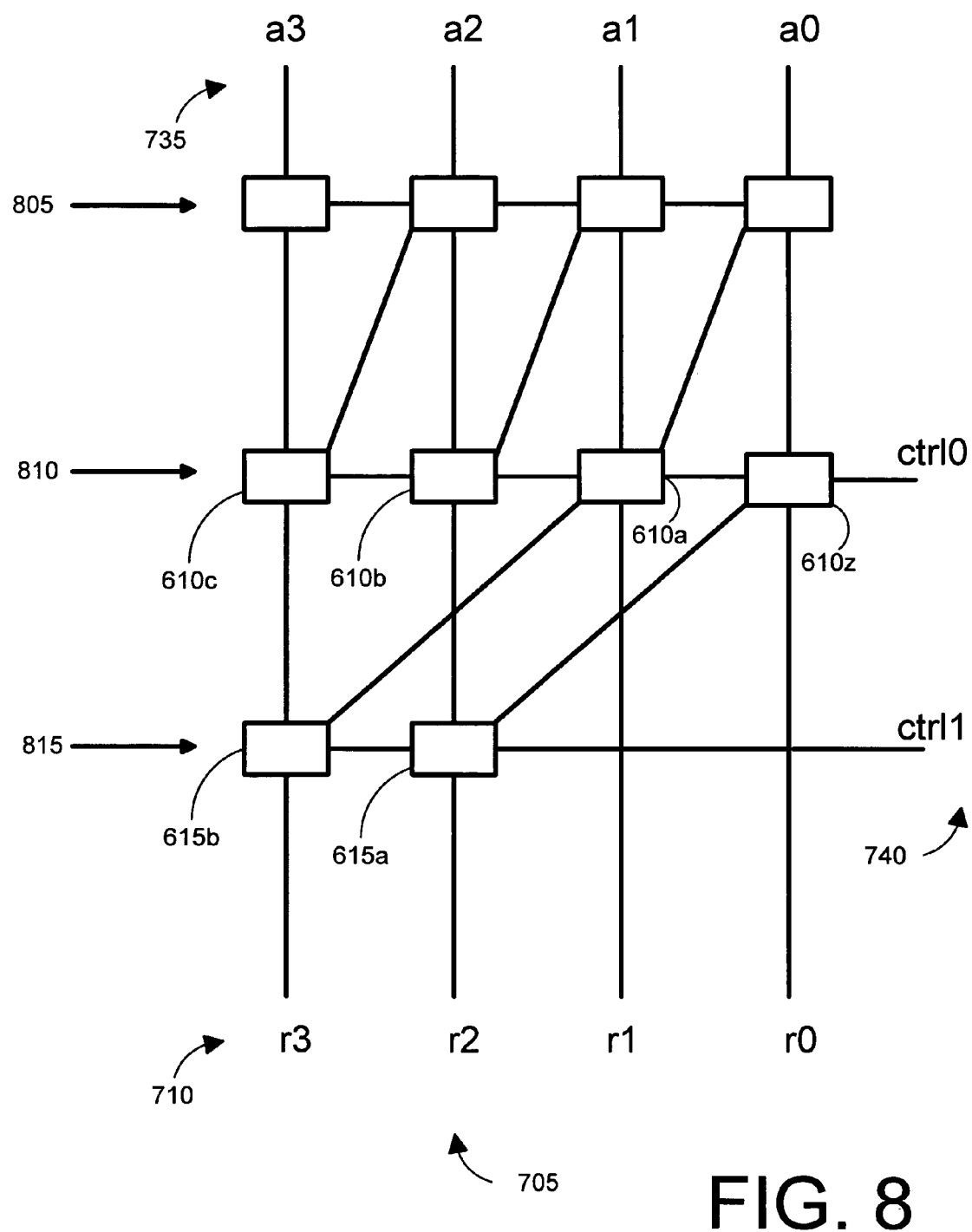
FIG. 8 is a functional block diagram of circuitry within the fractional shifter of FIG. 7.

FIG. 8 illustrates the circuitry generally found in shifter 705 of FIG. 7. While general purpose shifter 305 of FIG. 6 uses 5 stages of multiplexors 610 to operate, shifter 705 implements two stages. Further, fractional shifter 705 is configured to have the ability to shift logical left, which further decreases gate delay from general purpose shifter 305. As illustrated in FIG. 8, inputs 735 are labeled $a_3$ to $a_0$, outputs 710 are labeled $r_3$ to $r_0$, and select lines 740 are labeled $ctrl_1$ and $ctrl_0$.

Stage 0 buffering blocks 805 are identical to buffering blocks 605 from FIG. 6, except that this row comprises four such blocks. Similarly, stage 1 multiplexors 810 comprise four multiplexors (610$z$, 610$a$, 610$b$ and 610$c$), and stage two multiplexors 815 comprise two multiplexors (615$a$ and 615$b$).

Figure 9:
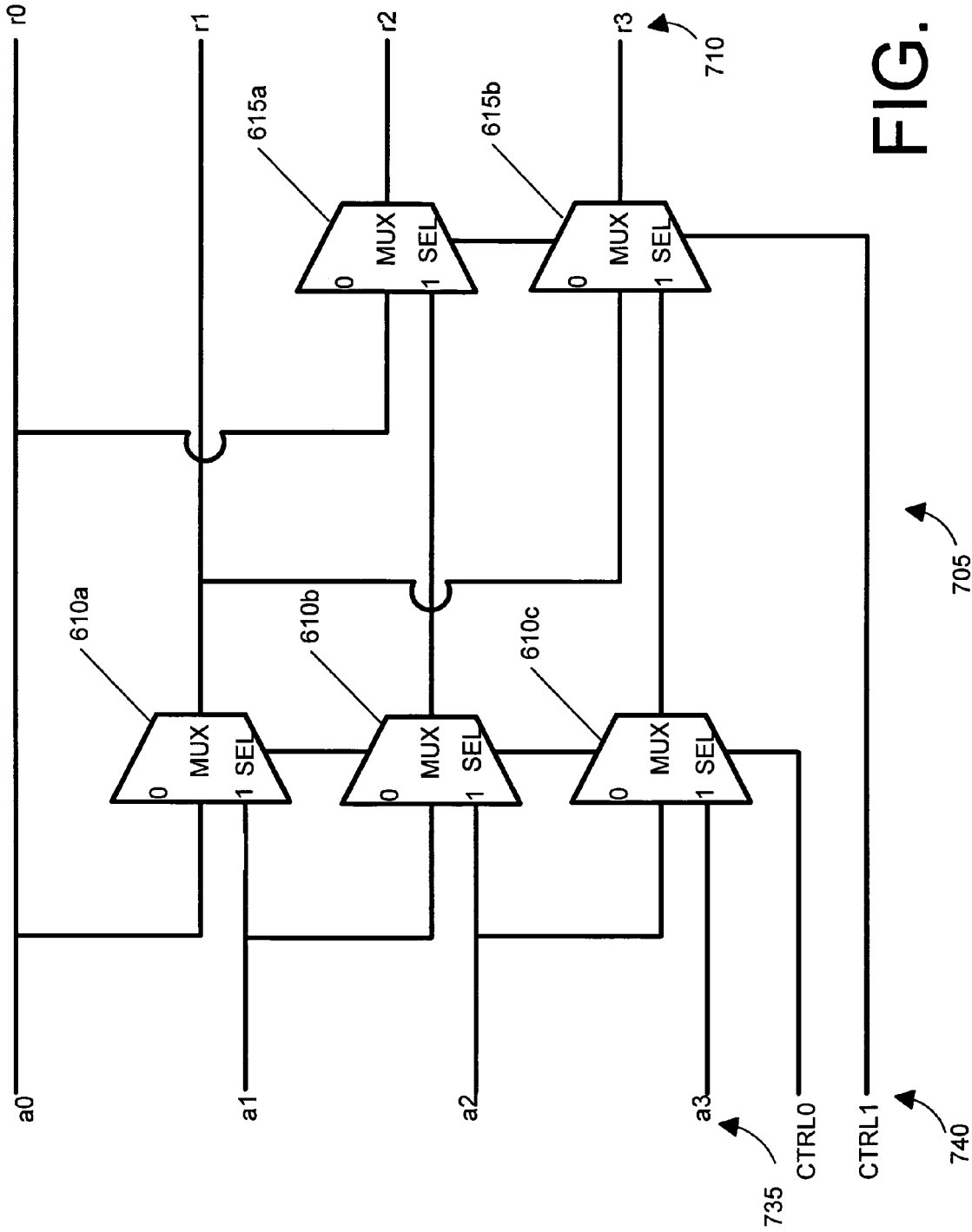
FIG. 9 is a functional block diagram of additional circuitry within the fractional shifter of FIG. 7.

FIG. 9 is an alternate representation of the circuitry in fractional shifter 705. This functional block diagram illustrates the operation of this particular shifter 705. As in FIG. 8, input lines 735 are labeled $a_0$ to $a_3$, output lines 710 are labeled $r_0$ to $r_3$, and shifter select lines 740 are labeled $ctrl_0$ and $ctrl_1$. Multiplexors 610$a$, 610$b$, and 610$c$ shown as receiving inputs $a_0$-$a_3$. This figure is included to more clearly illustrate the circuitry of FIG. 8. Similarly, reference may also be taken from FIG. 6 and FIG. 11.

In stage 1 of this circuit, input $a_0$ is coupled directly to output $r_0$ and also to the input to multiplexor 610$a$. Multiplexor 610$a$ is also coupled to input $a_1$ and select line $ctrl_0$. Input $a_1$ is also coupled to multiplexor 610$b$, along with input $a_2$ and select line $ctrl_0$. Multiplexor 610$c$ is coupled to input $a_2$ and $a_3$, along with select line $ctrl_0$.

In stage 2, multiplexor 615$a$ receives the output from multiplexor 610$b$ and $a_0$. Multiplexor 615$a$ receives $ctrl_1$ as its select line, and outputs to $r_2$. Multiplexor 615$b$ receives the output from multiplexor 610$c$ and the output from multiplexor 610$a$. Multiplexor 615$b$ receives $ctrl_1$ as input and outputs to $r_3$.

Figure 10:
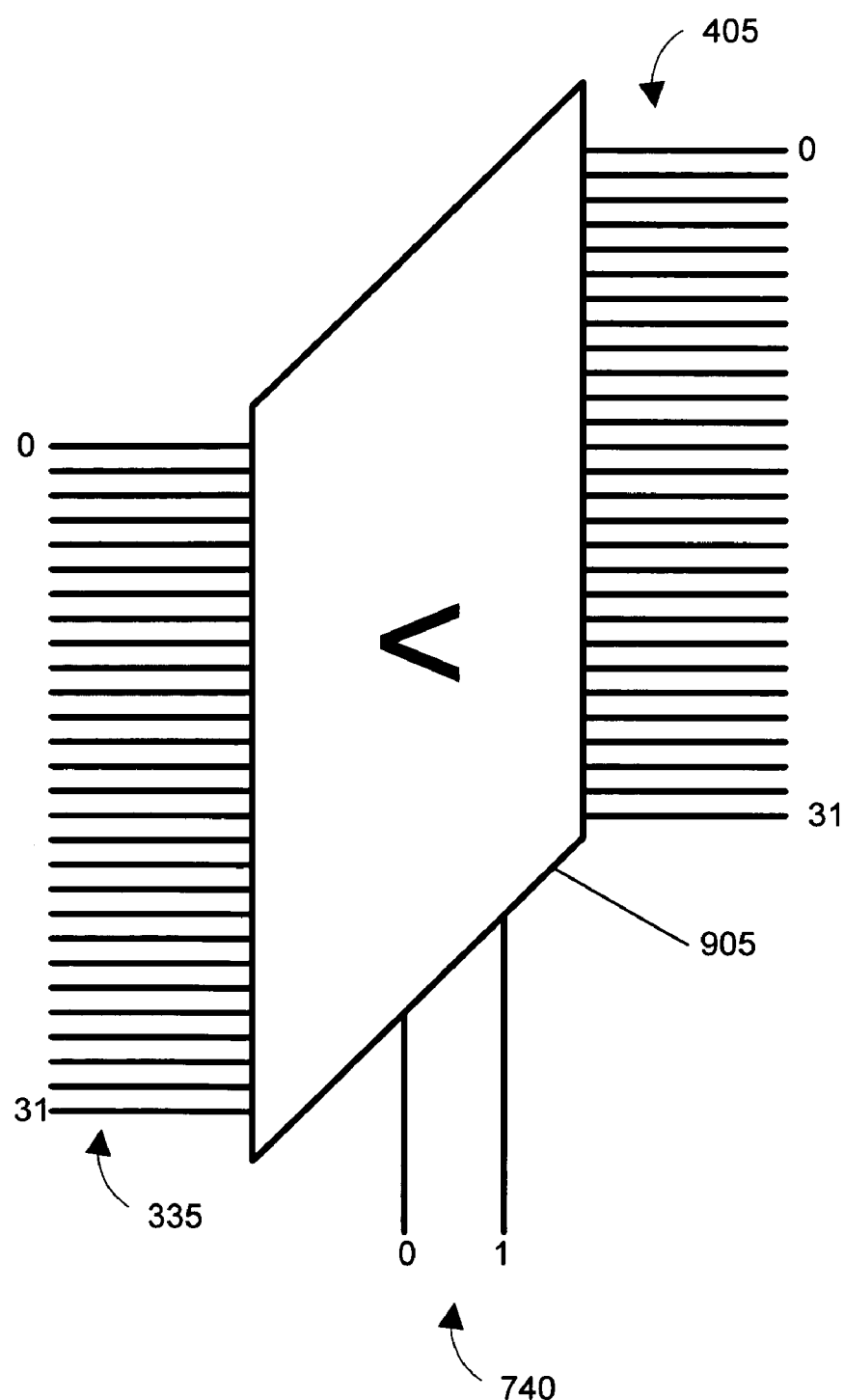
FIG. 10 is a diagram of an alternate embodiment of a fractional shifter for use in the microprocessor of FIG. 1.

FIG. 10 illustrates a block diagram of a fractional shifter 905, similar to fractional shifter 705 of FIG. 7. Fractional shifter 905, however has 32 inputs, 32 outputs, and a 2-bit select line. This 2-bit select line allows a 32-bit index to enter the shifter and be logically left shifted 1, 2, or 3 bit places.

Figure 11:
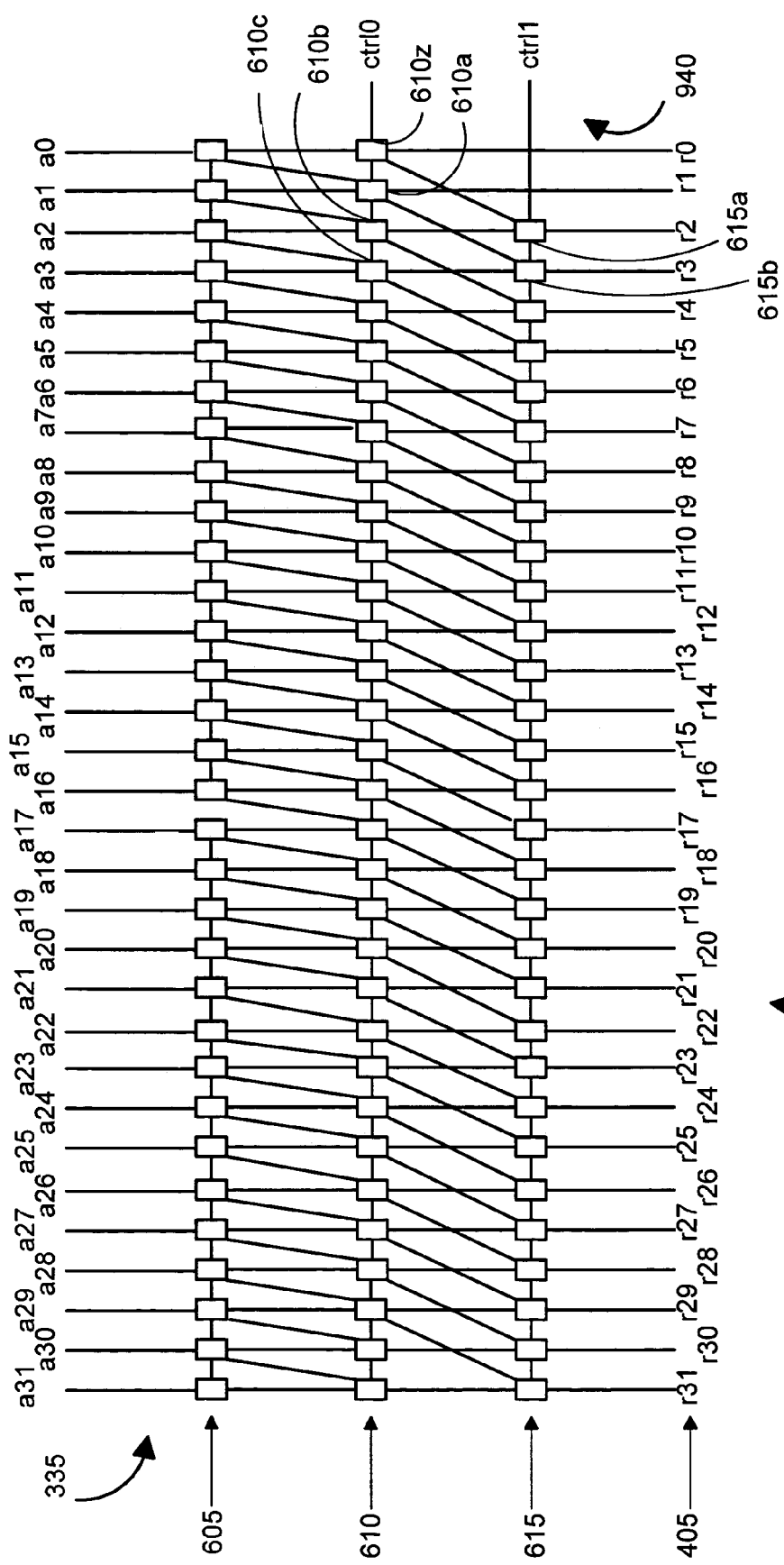
FIG. 11 is a functional block diagram of circuitry within the fractional shifter of FIG. 10.

FIG. 11 is a functional block diagram of circuitry present in fractional shifter 905 of FIG. 10. Similar to general purpose shifter 305 from FIG. 6, this shifter 905 has 32 inputs 335, and 32 outputs 405. However, similar to fractional shifter 705, this shifter is configured with two control lines 940 (labeled $ctrl_0$ and $ctrl_1$), and two stages of multiplexors 610 and 615. While there are many more multiplexors in fractional shifter 905 than in fractional shifter 705, this has a negligible effect on performance because multiplexors within a stage operate simultaneously. Since both shifter 905 and shifter 705 have two stages, they both run at approximately the same speed.

Figure 12:
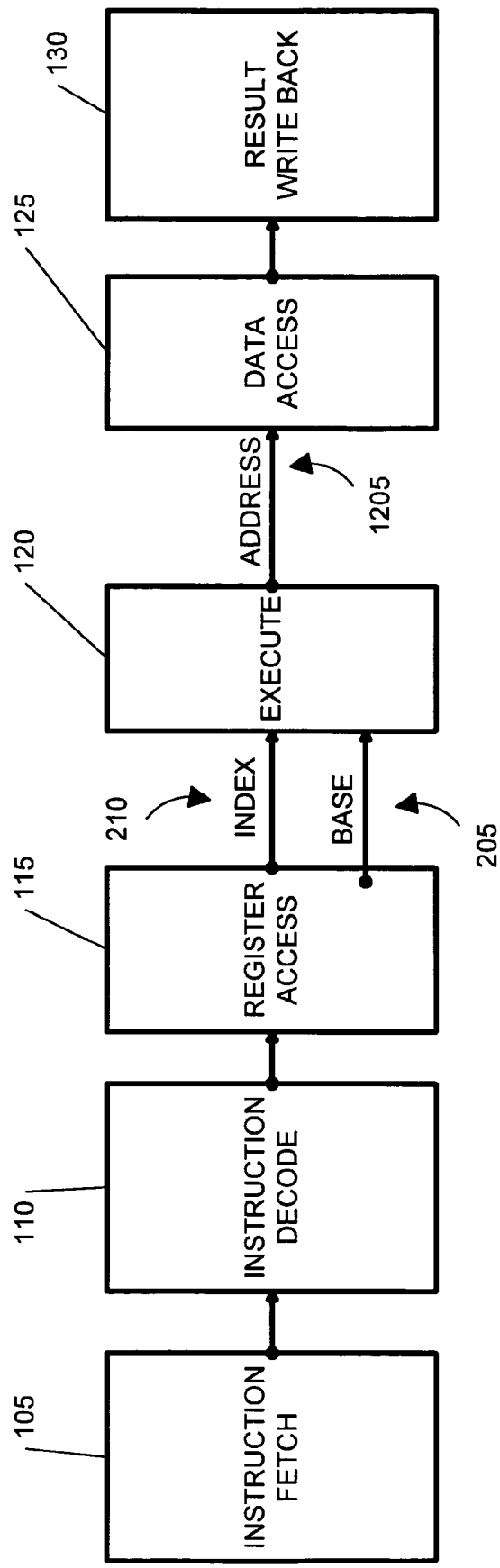
FIG. 12 is a functional block diagram of a pipeline configuration within a microprocessor utilizing one embodiment of this disclosure, as compared to the microprocessor of FIG. 1.

FIG. 12 is a functional block diagram of a pipeline configuration for a microprocessor configured to overcome the deficiencies of the microprocessor configuration of FIG. 2. This representation, while similar to the pipeline configurations of FIGS. 1 and 2, illustrate how the index 210 and base address 205 are input into execute stage 120. Execute stage 120 is then able to communicate the final address 1205 directly to data access stage 125 in a single clock cycle.

Figure 13:
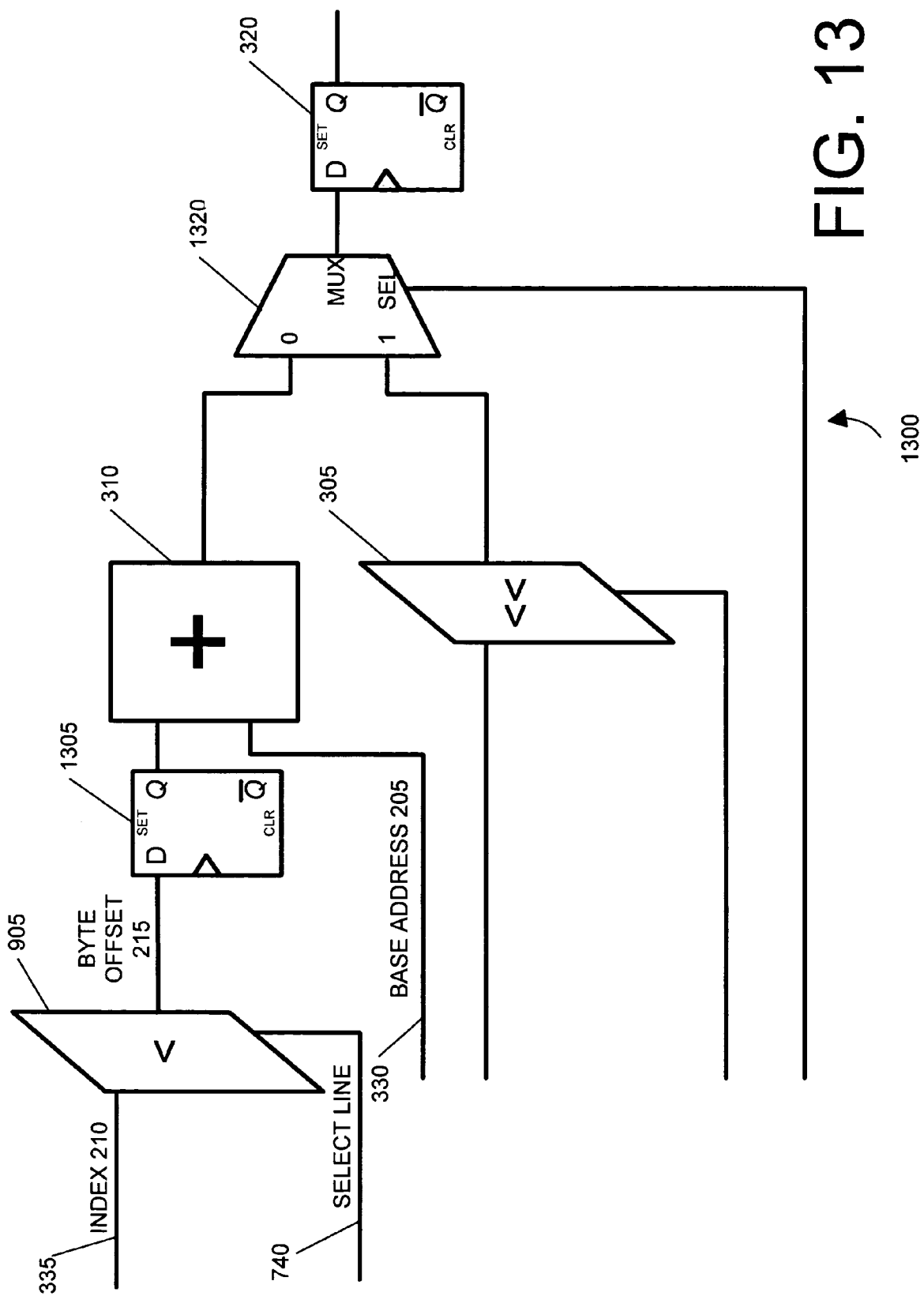
FIG. 13 is a functional block diagram one embodiment of circuitry pursuant to the present disclosure for use in the microprocessor of FIG. 1.

FIG. 13 is a functional block diagram of a circuit 1300 configured to communicate a final address in a single clock cycle, as illustrated in FIG. 12. The circuit 1300 comprises adder 310, fractional shifter 905, and full shifter 305. Also included are 2×1 multiplexor 1320 and flip-flop modules 320 and 1305.

In operation, index 210 is communicated to fractional shifter 905, with select line 740 controlling the amount shifted. Byte offset 215 is then communicated through flip-flop 1305 to adder 310. Base address 205 is also coupled to adder 310 via base address line 330. Adder 310 adds base address 205 and byte offset 215 and outputs the result (which is the final address) into multiplexor 1320. Multiplexor 1320 also receives input from general purpose shifter 305 and may select to output the final address through flip-flop module 320 and onto the next stage of the pipeline.

As a nonlimiting example, a present instruction may need access to a data structure such that circuit 1300 is used. Index 210 is input to fractional shifter 905, via shifter input line 335. Select line 740 indicates the amount to shift the index. Fractional shifter 905 outputs base offset 215 into flip-flop 1305, which stores the signal and outputs it to adder 310. Adder 310 also receives base address 205 via path 330. Adder 310 adds the two values and communicates the sum (final address 1205) to multiplexor 1320. Depending on the select input to multiplexor 1320, multiplexor 1320 outputs final address to flip-flop 320, which stores the signal and communicates it to the next stage in the pipeline.

Some of the benefits realized through an implementation such as this are that because fractional shifter 905 is used, there are fewer gate delays, thereby allowing for a faster clock speed. Further, by placing fractional shifter 905 in series with adder 310, the operation spans a single clock cycle.

Figure 14:
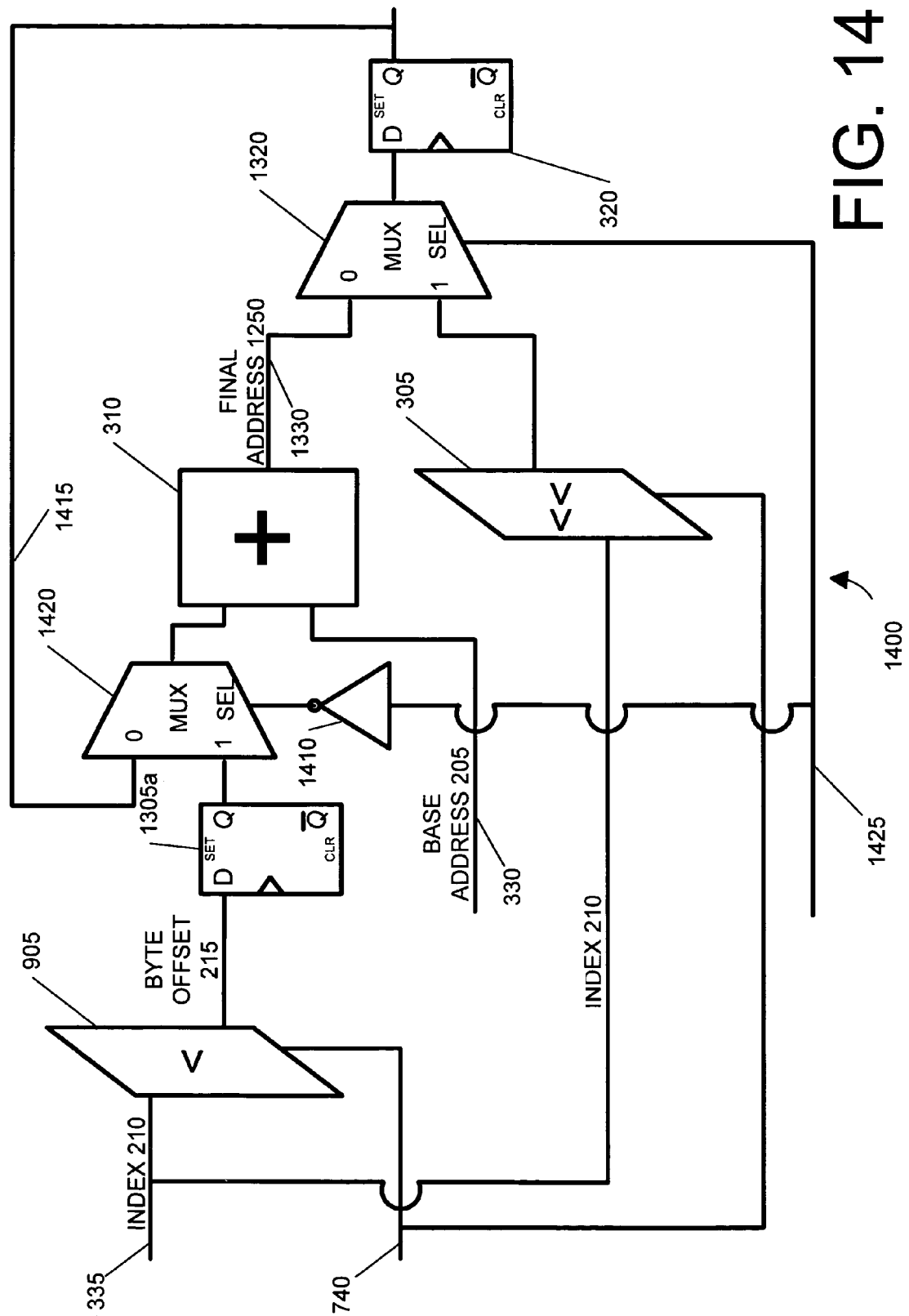
FIG. 14 is a functional block diagram of an alternate embodiment to FIG. 13.

FIG. 14 is a functional block diagram of an alternate embodiment circuit 1400 of the circuit of FIG. 13. The difference between the circuit 1300 from FIG. 13 and the circuit 1400 from FIG. 14 is that the circuit 1400 also includes multiplexor 1420, feedback line 1415, and inverter 1410. The purpose of this configuration is to allow for quicker operation when index 210 is shifted logically left by 1, 2, or 3 bits, while also allowing for the capabilities of the general purpose shifter.

In operation, index 210 is communicated both to fractional shifter 905 and general purpose shifter 305 via shifter input line 335. If index 210 is to be shifted by up to 3 bit places, fractional shifter 905 will shift index 210 the appropriate amount and output the byte offset 215 signal. Byte offset 215 is communicated through flip-flop module 1305$a$ into multiplexor 1420.

As a nonlimiting example, if index 210 is shifted up to 3 bit places, multiplexor select line 1425 communicates a logical "0" to inverter 1410, which sends a logical "1" to multiplexor 1420, thereby allowing byte offset 215 to pass to adder 310. Byte offset 215 and base address 205 are then added in adder 310 to produce a final address 1250. Final address 1250 is communicated to multiplexor 1320, which allows the final address 1250 to pass in this non-limiting example because the multiplexor select line 1425 sends a logical "0" to multiplexor 1320 select input. Final address 1250 is then communicated to the next stage in the pipeline.

If on the other hand, index 210 is to be shifted by an amount greater than 3 bit places (or otherwise altered in a manner that the general purpose shifter 305 executes), multiplexor select line 1425 will communicate a logical "1" to inverter 1410 and multiplexor 1320, which will allow the output of general purpose shifter 305 to be communicated to multiplexor 1320. The output from multiplexor 1320 and flip-flop module 320 is then communicated to multiplexor 1420 via feedback line 1415. Multiplexor 1420 is configured to allow this signal to pass to adder 310 because the signal of multiplexor select line 1425 is inverted in inverter 1410. Adder 310 will then add the byte offset and base address, and communicate the output to multiplexor 1320. Multiplexor 1320 will allow this signal to be communicated to flip flop 320 because by this time (clock cycle 2), multiplexor select line has changed to logical "0", which is communicated to the select input of multiplexor 1320. The result is then sent to the next stage of the pipeline.

As one of ordinary skill in the art would easily realize, the illustrations in the discussed figures are merely representations that help illustrate the present disclosure. These figures are not intended to limit the disclosure in any way. For example, the figures illustrate components with 32-bits. While this is one representation, components with different word-length capabilities are also included herein. Furthermore, circuit components discussed specifically may easily be substituted for other components not discussed that are configured to perform similar operations. On a similar note, references to logical states in the discussed figures are merely nonlimiting examples of signals that may be used. As is evident to one of ordinary skill in the art, these signals may be altered to achieve similar results.

It should be emphasized that many variations and modifications may be made to the above-described embodiments. All such modifications and variations are intended to be included herein within the scope of this disclosure and protected by the following claims.

The invention c;aimed is:

1. A circuit configured to access art element in a data structure, comprising:
    a first shifter configured to receive a first shifter input and a first shift amount, the first shifter further configured to shift the first shifter input according to the first shift amount to generate a shifted value, the first shifter further configured to communicate the shifted value;
    a second shifter configured to receive a second shifter input and a second shift amount, the second shifter further configured to shift the second shifter input according to the second shift amount, the second shifter further configured to communicate a base offset;
    an adder coupled to the second shifter, the adder configured to receive the base offset from the second shifter and a base address, the adder further configured to communicate a final address; and
    a multiplexor configured to receive the final address from the adder, the multiplexor further configured to select the final address if a data structure is being accessed and the shifted value if a data structure is not being accessed,
    wherein the first shifter is configured to shift the first shifter input a first number of bit places up to a first maximum amount,
    wherein the second shifter is configured to shift the second shifter input a second number of bit places up to a second maximum amount, and
    wherein the first maximum amount is less than the second maximum amount.

2. The circuit of claim 1, wherein the first shifter is a general purpose shifter end the second shifter is a fractional shifter.

3. The circuit of claim 1, wherein the second shifter is further configured to shift logical left.

4. The circuit of claim 1, wherein the second shifter operates with fewer gate delays than the first shifter.

5. The circuit of claim 1, wherein the second shifter is configured to perform a subset of operations that the first shifter is configured to perform.

6. The circuit of claim 1, further comprising at least one flip-flop configured to hold a signal for at least one clock cycle.

7. A method for accessing an element in a data structure comprising:
    receiving an array with at least one index value;
    receiving a base address;
    shifting a first index value from the array with at least one index value with a fractional shifting logic, wherein the fractional shifting logic is configured to shift logically left, wherein the fractional shifting logic is configured to shift the first index value a first number of bit places up to a first maximum amount, and wherein the fractional shifting logic is further configured to communicate a base offset;
    producing a final address by adding the base offset and the base address at an adding logic;
    receiving a second index value from the array with the at least one index value at a general purpose shifting logic, the general purpose shifting logic being configured to shift the second index value a second number of bit places up to a second maximum amount, and wherein the general purpose shifting logic is further configured to communicate a shifted index value; and
    selecting the final address from the adding logic if a data structure is being accessed, and selecting the shifted index value from the general purpose shifting logic if a data structure is not being accessed,
    wherein the first maximum amount is less than the second maximum amount.

8. The method of claim 7, wherein the fractional shifting logic is configured to perform a subset of operations that the general purpose shifting logic is configured to perform.

9. The method of claim 7, wherein the fractional shifting logic operates more quickly than the general purpose shifting logic.

10. The method of claim 7, further comprising selecting the base offset from the fractional shifting logic if a data structure is being accessed and the shifted index value from the general purpose shifting logic if a data structure is not being accessed.

11. A system for accessing an element in a data structure, comprising:
    an array with at least one index value;
    a base address;
    a fractional shifting component configured to produce a first byte address by shifting a first index value from the array, the fractional shifting component configured to shift the first index value a first number of bit places up to a first maximum amount;

a general purpose shifting component configured to produce a second byte address by shifting a second index value from the array, the general purpose shifting component configured to shift the second index value a second number of bit places up to a second maximum amount; and an adding component configured to produce a final address by adding the base address and the first byte address, wherein the first maximum amount is less than the second maximum amount.

12. The system of claim 11, wherein the fractional shifting component is configured to perform a subset of operations that the general purpose shifting component is configured to perform.

13. The system of claim 12, wherein the fractional shifting component is configured to operate with fewer gate delays than the general purpose shifting component.

14. The system of claim 12, further comprising a selector configured to select the final address if a data structure is being accessed, and the second byte address from the general purpose shifting component if a data structure is not being accessed.

15. A computer readable storage medium for accessing an element in a data structure comprising:

first logic receiving an array with at least two index values;

second logic receiving a base address;

third logic shifting a first index value of the at least two index values with fractional shifting logic, wherein the fractional shifting logic is configured to shift logically left, wherein the fractional shifting logic is configured to shift the first index value a first number of bit places up to a first maximum amount, wherein the fractional shifting logic is further configured to communicate a base offset;

fourth logic producing a final address by adding the base offset and the base address;

fifth logic shifting a second index value of the at least two index values with a general purpose shifting logic, wherein the general purpose shifting logic is configured to shift logically left, wherein the general purpose shifting logic is configured to shift the second index a second number of bit places up to a second maximum amount; and sixth logic selecting the final address from the fourth logic if a data structure is being accessed, and from the general purpose shifting logic if a data structure is not being accessed;

wherein the fractional shifting logic is configured to a subset of operations that the general purpose shifting logic is configured to perform, wherein the first maximum amount is less than the second maximum amount.

16. The computer readable storage medium of claim 15, wherein the fractional shifting logic operates more quickly than the general purpose shifting logic.

17. The computer readable storage medium of claim 15, further comprising selecting the base offset from the fractional shifting logic if a data structure is being accessed and an output signal from the general purpose shifting logic if a data structure is not being accessed.

* * * * *